United States Patent Office 3,600,386
Patented Aug. 17, 1971

3,600,386
4-SUBSTITUTED OXADIAZINEDIONES
George Levitt, Wilmington, Del., assignor to E. I. du Pont de Nemours and Company, Wilmington, Del.
No Drawing. Filed Mar. 12, 1969, Ser. No. 806,686
Int. Cl. C07d 87/32
U.S. Cl. 260—244                                  10 Claims

ABSTRACT OF THE DISCLOSURE

The 4-substituted oxadiazinediones of the formula

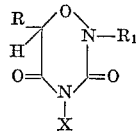

wherein R is hydrogen or methyl; $R_1$ is hydrogen, alkyl of 1 through 6 carbon atoms or phenyl; and X is —S—$R_2$,

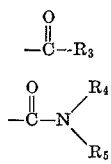

—$CH_2$—X—$R_6$, phenoxyacetyl; or acetoacetyl are useful as plant growth regulants. Representative of the oxadiazinediones of the above formula are 6-methyl-4-(trichloromethylthio)-2H-1,2,4-oxadiazine-3,5-(4H,6H)-dione;
4-benzoyl-6-methyl-2H-1,2,4-oxadiazine-3,5-(4H,6H)-dione;
4-trichloroacetyl-6-methyl-2H-1,2,4-oxadiazine-3,5-(4H,6H)-dione;
4,4'-oxalylbis[6-methyl-2H-1,2,4-oxadiazine-3,5-(4H,6H)-dione];
6-methyl-4-(p-chlorophenylcarbamoyl)-2H-1,2,4-oxadiazine-3,5-(4H,6H)-dione;
4,4'-carbonylbis[6-methyl-2H-1,2,4-oxadiazine-3,5-(4H,6H)-dione];
6-methyl-4-(o-fluorophenylcarbamoyl)-2H-1,2,4-oxadiazine-3,5-(4H,6H)-dione; and
6-methyl-4-(hydroxymethyl)-2H-1,2,4-oxadiazine-3,5-(4H,6H)-dione.

SUMMARY OF THE INVENTION

In summary, this invention is directed to compounds of the formula (1) 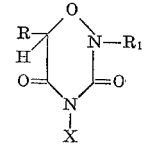

wherein

R is hydrogen or methyl;
$R_1$ is hydrogen, alkyl of 1 through 6 carbon atoms or phenyl; and
X is phenoxyacetyl; phenoxyacetyl substituted on phenyl with from 1 through 3 chlorine atoms; acetoacetyl;

—S—$R_2$ wherein $R_2$ is alkyl of 1 through 3 carbon atoms; alkyl of 1 through 3 carbon atoms substituted with from 1 through 7 chlorine atoms; phenyl; or phenyl substituted with one nitro group or from 1 through 3 chloro, methyl or methoxy group;

wherein $R_3$ is alkyl of 1 through 6 carbon atoms, alkyl of 1 through 6 carbon atoms substituted with from 1 through 7 chlorine atoms or 1 through 2 methoxy groups; phenyl; phenyl substituted with 1 through 2 nitro, halogen, alkyl of 1 through 3 carbon atoms or methoxy groups; benzyl; benzyl substituted with 1 through 2 nitro, chloro, methyl or methoxy groups; alkoxy of 1 through 6 carbon atoms; alkylthio of 1 through 6 carbon atoms; alkoxycarbonyl of 2 through 5 carbon atoms; or

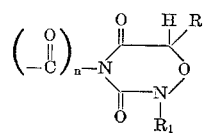

wherein $n$ is 1 or 2 and R and $R_1$ are as defined above;

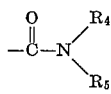

wherein $R_4$ is hydrogen or alkyl of 1 through 3 carbon atoms; and $R_5$ is hydrogen; alkyl of 1 through 6 carbon atoms; phenyl; or phenyl substituted with 1 through 2 nitro, chloro, methyl or methoxy groups; or $$-CH_2-X-R_6$$

wherein X is oxygen or sulfur, $R_6$ is alkyl of 1 through 4 carbon atoms or hydrogen and provided that when X is sulfur, $R_6$ can be phenyl or benzyl; and when X is oxygen, $R_6$ can be cyclohexyl.

The preferred compounds of Formula I are those wherein R is methyl, $R_1$ is hydrogen, X is hydroxymethyl, $$-S-R_2$$

wherein $R_2$ is an alkyl of 1 through 3 carbon atoms substituted with from 1 through 5 chlorine atoms or

wherein $R_3$ is an alkyl or 1 through 3 carbon atoms. Most preferred of the compounds of Formula I are the following:

6-methyl-4-(trichloromethylthio)-2H-1,2,4-oxadiazine-3,5-(4H,6H)-dione
4-benzoyl-6-methyl-2H-1,2,4-oxadiazine-3,5-(4H,6H)-dione
6-methyl-4-trichloroacetyl-2H-1,2,4-oxadiazine-3,5-(4H,6H)-dione
6-methyl-4-(p-chlorophenylcarbamoyl)-2H-1,2,4-oxadiazine-3,5-(4H,6H)-dione
6-methyl-4-(o-fluorophenylcarbamoyl)-2H-1,2,4-oxadiazine-3,5-(4H,6H)-dione
4,4'-oxalylbis[6-methyl-2H-1,2,4-oxadiazine-3,5-(4H,6H)-dione]
4,4'-carbonylbis[6-methyl-2H-1,2,4-oxadiazine-3,5-(4H,6H)-dione]
4-hydroxymethyl-6-methyl-2H-1,2,4-oxadiazine-3,5-(4H,6H)-dione This invention is also directed to methods of selectively regulating the growth of plants comprising applying thereto an effective amount of a compound of Formula I. This invention is further directed to plant growth regulant compositions comprising a compound of Formula I and an agricultural diluent.

DESCRIPTION OF THE INVENTION

As stated above, this invention relates to novel oxadiazinediones and to their use in regulating the growth of a variety of plants.

Plant growth regulation

A variety of beneficial results can be obtained through the regulation of plant growth by applying to the plant a compound of Formula I. These compounds are particularly useful for retarding the growth of a variety of plant species, especially those of the grass family. For example, when application is made to blueglass, crabgrass or Black Valentine bean at rates of from about 0.5 to about 20 kilograms per hectare, the rate of growth of the treated plant is substantially reduced.

With respect to one particularly unique aspect of plant growth regulation, it has been found that when a compound of Formula I is applied to sugar-containing plants at the proper time during their growth, a surprising increase in the sugar content of the plant can be obtained. For sugar cane and sorghum, which are grown for sucrose production, this increase in sugar content is observed directly as an increase in the yield from a given area of cropland. With other plants such as apples, cherries, oranges, pears and grapes the increase is observed by analysis of the plant or by analysis of the harvested parts thereof. Obviously, increased sugar levels improve the palatability of the plant or plant parts and offer improved dietary value. While the mechanism involved in this increase in sugar content is not fully understood, it is apparent that the compounds used in this invention redirect the carbohydrate metabolism of the plant in such a way as to increase the sugar level in the plant juices.

When compounds of Formula I are utilized to obtain an increase in the sugar content of plants, application is preferably carried out at from about 10 to about 60 days prior to the normally scheduled harvest of the plants or plant parts, from about 20 to about 40 days being the most preferred interval between treatment and harvest.

Application of a compound of Formula I to sugar-containing crops at rates of from about 0.1 to about 20 kilograms per hectare will usually result in a substantial increase of the sugar content of the treated plants, the preferred rate being from about 0.25 to about 10 kilograms per hectare.

Compounds of Formula I are most advantageously employed in the methods of this invention in the form of foliar sprays. Addition of a nonphytotoxic surfactant to the spray usually aids in the penetration of the compound of Formula I into the foliage and increases the observed plant growth regulatory activity.

Experimental work suggests that the compounds of Formula I are broken down, after application to plants, to the respective 4-unsubstituted-2,3,4,5-tetrahydro-[6H]-1,2,4-oxadiazine-3,5-diones. It is believed that the compounds of Formula I are broken down under the conditions of light, moisture and presence of enzymes ordinarily found in and on living plants.

While application rates for the various aspects of plant growth regulation will ordinarily vary from about 0.5 to about 20 kilograms per hectare, and preferably from 1 to 8 kilograms per hectare, it will be appreciated that the amount of a compound of Formula I that will be effective to provide the desired type and degree of growth regulation will vary, for example, with the particular crop involved, plant density, the application method, prevailing weather conditions and the particular active ingredient used. Since many factors are involved, it is not possible to indicate generally one rate of application suitable for all situations. However, effective resolution of these factors in determining the effective growth regulating amount in a given situation is well within the ability of persons of ordinary skill in the art.

Preparation

The substituted oxadiazinediones of Formula I can be prepared by reaction of the parent oxadiazinediones (available by known methods, such as given in U.S. Pat. 3,238,200) with appropriate substitution reagents. A base is also present in those cases in which an acid is liberated during the reaction. Suitable substitution reagents are sulfenyl halides, carboxylic acid halides, isocyanates, carboxylic acid anhydrides, ketenes, formaldehyde, etc. The syntheses proceed according to the equation:

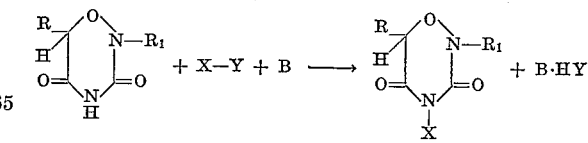

where R, $R_1$ and X are as defined in Formula I, Y is a suitable leaving group such as halogen or carboxylate, and B is an appropriate base such as an alkali metal hydroxide, alkaline earth hydroxide, trialkylamine, or alkali metal alcoholate. When the substitution reagent is formaldehyde, a ketene or isocyanate, there is no leaving group Y and the base B is not required in stoichiometric amount. Small amounts of catalysts such as triethylamine or dibutyltin dilaurate may have a beneficial effect in cases for which the substitution reagent is an isocyanate. When the substitution reagent is formaldehyde, if a mercaptan or alcohol is added, the group X of the product will be mercaptomethyl or alkoxymethyl respectively. Small amounts of acidic catalysts, such as hydrogen chloride, can be used in reactions of formaldehyde with mercaptans or alcohols.

The reactions can proceed either in an organic solvent such as in methanol or tetrahydrofuran with sodium methoxide or triethylamine as the base; or in a heterogeneous system, with the organic reactants in a water-immiscible organic solvent (e.g., methylene chloride) as one phase and aqueous base such as sodium hydroxide solution as the other phase. When the substitution reagent is an isocyanate or ketene, an inert solvent such as benzene is used. When formaldehyde is the substitution reagent the reaction is ordinarily carried out in water.

The reaction can be performed by adding one molar equivalent of the substitution reagent to a mixture of one molar equivalent of the oxadiazinedione plus one molar equivalent of base, where applicable. The order of addition of reagents can be varied, e.g. by addition of the base to a mixture of the oxadiazinedione plus the substitution reagent, or by simultaneous addition of the base and substitution reagent to the oxadiazinedione. The proportions of reactants may be varied slightly, but best results are usually obtained when the excess of any reagent is less than 25% over the stoichiometric amount.

The reactions usually proceed spontaneously at room temperature. In cases where heat is evolved, external cooling can be applied to moderate the rate of reaction if desired. Those reactions which do not proceed readily at room temperature, e.g., when the substitution reagent is an isocyanate, can be facilitated by heating in an inert solvent such as benzene.

The reaction products which are insoluble in the reaction medium can be isolated by filtration. Reaction products which are soluble in the reaction medium can be isolated by evaporation of the solvent. The reaction products usually are crystalline solids which can be purified by recrystallization.

It should be understood that the location of the substituent group X in the compounds of Formula I is not certain in some instances. If $R_1$ is hydrogen in the oxadiazinedione starting material, the substituent group X could be attached in the final product to either nitrogen atom in the ring. For convenience and uniformity the compounds of this invention are all named according to Formula I, however it is contemplated that some compounds prepared as described hereinafter will contain a substituent group X on the No. 2 nitrogen atom rather than the No. 4 nitrogen atom of the ring.

Compositions

Compositions of this invention suitable for practical use as plant growth regulants will include one or more compounds of Formula I and can include surface-active agents, solid or liquid diluents and other materials as desired to produce wettable powders, suspensions, dusts, solutions, suspensions, granules, pellets, or high-strength compositions.

The surface-active agents, or surfactants, useful in the formulations of this invention act as wetting, dispersing and emulsifying agents which assist dispersion of the active material in the spray, and improve wetting of waxy foliage and the like by the spray. The surfactants can include such anionic, non-ionic and cationic agents as have been used heretofore in pesticidal compositions of similar type. A detailed list of such agents may be found in "Detergents and Emulsifiers, 1967 Annual," (John W. McCutcheon, Inc.).

Anionic and non-ionic surfactants are preferred. Among the anionic surfactants, preferred ones are alkali and alkaline earth salts of alkylarylsulfonic acids such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isethionate. Among the non-ionic surfactants, preferred ones include octylphenyl polyethylene glycol ethers, dodecylphenyl polyethylene glycol ethers, polyoxyethylene derivatives of sorbitan fatty esters, polyoxyethylene derivatives of long-chain alcohols and mercaptans, as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants are present in compositions of this invention in amounts up to about 20% by weight based on the total weight of the resulting composition. When larger amounts of surfactant are desired, as for further improvement of contact activity, mixing in the spray tank is usually preferable for convenience.

Powder and dust preparations can be made by blending the active ingredient, with or without surfactant, with finely divided solids such as natural clays, pyrophyllite, diatomaceous earth; flours such as walnut shell, wheat, redwood, soya bean and cotton seed; or inorganic substances such as fine silica, silica aluminates, calcium phosphate, sulfur and lime. The compositions are made by thoroughly blending the active ingredient with the diluent and other additives. Usually a grinding step, as in a hammer mill or fluid energy mill, is included. The particles in dust and powder operations are preferably less than 50 microns in average diameter.

Preferred wettable powder formulations will contain 10% or more active ingredient together with sufficient surfactant and inert diluent to permit dispersion in water for spray application. Compositions intended for dust application will generally contain less than 50% active ingredient.

Powdered compositions can be converted to granules by adding moisture, treating mechanically and drying. Mechanical devices such as granulating pans, mixers and extruders can be used. Water soluble binders, such as inorganic salts, urea, ligninsulfonates, methylcellulose, and the like, can be included in these particulate formulations in amounts up to about 25% by weight of the finished granule or pellet. Such materials also aid in disintegration of the pellet and release of the active ingredient under field conditions. Alternatively, a solution or suspension of the active ingredient can be sprayed on the surface of preformed granules of clay, vermiculite, corn cob and the like. Surfactants may also be included in formulations of the latter type. Another suitable method for preparing granules involves compaction of powdered mixes into sheets, followed by granulation.

Suspension formulations can be made in water, or in organic solvents, or in mixtures of water and water-miscible organic solvents in which the active ingredient has a solubility under about 0.1%. The preparations can include, in addition to the active ingredient and liquid carrier, surfactants, viscosity control agents, anti-microbial agents and other modifiers. They are prepared by grinding the components in a sand mill or pebble mill preferably until the average particle size is under 20 microns. Water is the preferred liquid carrier. Hydrocarbon carriers should have boiling points above about 125° C. for safety in handling. Suspensions in hydrocarbons are suitable for extension in herbicidal or other spray oils and, by inclusion of a suitable emulsifying agent, may also be made sprayable from water.

The compounds of this invention are generally not sufficiently soluble in cheap, water-immiscible solvents for economic use in emulsifiable concentrates. For particular purposes low strength emulsifiable mixtures can be made in the conventional way using chlorinated hydrocarbons, such as methylene chloride and chloroform, as solvents. Solutions in polar solvents such as dimethylformamide or dimethyl sulfoxide with or without co-solvents such as glycols, ketones as esters may be used directly for low-volume applications or extended with oil or other solvents for conventional spray applications.

All compositions intended for spray use can contain minor amounts of additives to reduce foam, inhibit corrosion, prevent claying, reduce caking, etc. as the conditions of use may dictate. The conditions of need for and use of such additives are generally known in the art.

The compounds of Formula I are moderately sensitive to basic materials. Therefore, formulations should be checked for this factor. Large amounts of basic diluents such as talc should not be used, for example. Basic solvents are also not suitable. Preferably, ingredients should be chosen so that slurries have a pH below about 8.

In the following examples all parts and percentages are by weight unless otherwise indicated.

EXAMPLE 1

Preparation of 6-methyl-4-[trichloromethylthio]-2H-1,2,4-oxadiazine-3,5-(4H, 6H)-dione A mixture of 260 parts of 6-methyl-2H-1,2,4-oxadiazine-3,5-(4H, 6H)-dione, 1000 parts of water, 80 parts of sodium hydroxide and 1000 parts of methylene chloride is stirred vigorously while 372 parts of trichloromethanesulfenyl chloride is added slowly, with cooling to approximately 20 to 25° C. The mixture is stirred at room temperature for two hours. The precipitate which forms is collected by filtration, washed by slurrying with ice-cold water, and dried, to give the desired 6-methyl-4-[trichloromethylthio]-2H-1,2,4-oxadiazine-3,5-(4H, 6H)-dione, which exhibits a melting point of 163 to 168° C.

Analysis.—Calcd. for $C_5H_5Cl_3N_2OS$ (percent): C, 21.5; H, 1.80; N, 10.0. Found (percent): C, 21.88; H, 1.81; N, 10.27.

EXAMPLE 2

Preparation of 6-methyl-4-(2,4-dinitrophenylthio)-2H-1,2,4-oxadiazine-3,5-(4H, 6H)-dione A mixture of 6.5 parts of 6-methyl-2H-1,2,4-oxadiazine-3,5-(4H, 6H)-dione, 10 parts of water, 2 parts of sodium hydroxide, and 67 parts of methylene chloride is stirred vigorously while a solution of 11.7 parts of 2,4-dinitrobenzenesulfenyl chloride in approximately 330 parts of methylene chloride is added slowly, with cooling to approximately 25° C. The mixture is stirred at room temperature for one hour. The solid precipitate is collected by filtration and recrystallized from acetonitrile, then from ethyl acetate-benzene to give the desired 6-methyl - 4 - (2,4-dinitrophenylthio)-2H-1,2,4-oxadiazine-3,5-(4H, 6H)-dione, which exhibits a melting point of 211 to 213° C. with decomposition.

Analysis.—Calcd. for $C_{10}H_8N_4O_7S$ (percent): C, 36.6; H, 2.46; N, 17.06. Found (percent): C, 37.05; H, 2.57; N, 17.08.

EXAMPLE 3

Preparation of 6-methyl-4-benzoyl-2H-1,2,4-oxadiazine 3,5-(4H, 6H)-dione

A mixture of 6.5 parts of 6-methyl-2H-1,2,4-oxadiazine-3,5-(4H, 6H)-dione, 10 parts of water, 2 parts of sodium hydroxide, and 67 parts of methylene chloride is stirred vigorously while 7 parts of benzoyl chloride is added, with cooling to 20 to 25° C. After completion of this addition, the external cooling bath is removed and the mixture is stirred vigorously for one-half hour, during which time the temperature rises a few degrees and then falls to room temperature. The precipitate which forms is collected by filtration and recrystallized from alcohol to give the desired 6-methyl-4-benzoyl-2H-1,2,4-oxadiazine-3,5-(4H, 6H)-dione, which exhibits a melting point of 184 to 188.5° C.

Analysis.—Calcd. for $C_{11}H_{10}N_2O_4$ (percent): C, 56.4; H, 4.30; N, 11.95. Found (percent): C, 56.35; H, 4.26; N, 11.92.

EXAMPLE 4

Preparation of 4,4'-oxalyl bis-[6-methyl-2H-1,2,4-oxadiazine-3,5-(4H, 6H)-dione]

A mixture of 13 parts of 6-methyl-2H-1,2,4-oxadiazine-3,5-(4H, 6H)-dione, 20 parts of water, 4 parts of sodium hydroxide, and 135 parts of methylene chloride is stirred vigorously while 6.35 parts of oxalyl chloride is added, with cooling to 25° C. The mixture is stirred rapidly at room temperature for one hour. The solid which precipitates is collected by filtration and recrystallized from aqueous ethanol to give the desired 4,4'-oxalyl bis-[6-methyl-2-H-1,2,4 - oxadiazine-3,5-(4H, 6H) - dione], which exhibits a melting point of 215 to 218° C. with decomposition.

Analysis.—Calcd. for $C_{10}H_{10}N_4O_8$ (percent): C, 38.2; H, 3.21; N, 17.8. Found (percent): C, 37.98; H, 3.18; N, 17.69.

EXAMPLE 5

Preparation of 6-methyl-4-trichloroacetyl-2H-1,2,4-oxadiazine-3,5-(4H,6H)-dione

A solution of 5.05 parts of triethylamine in 22 parts of tetrahydrofuran is added over approximately 10 minutes to a mixture of 90 parts of tetrahydrofuran, 6.5 parts of 6-methyl-2H-1,2,4-oxadiazine-3,5 - (4H,6H) - dione, and 9.1 parts of trichloroacetyl chloride. The mixture is stirred and boiled at reflux temperature for 1 hour and is then cooled to room temperature and filtered. Solvent is removed from the filtrate under vacuum and the residue is recrystallized from acetonitrile to give white crystals of 6 - methyl-4-trichloroacetyl-2H-1,2,4-oxadiazine - 3,5-(4H,6H)-dione, which exhibits a melting point of 215–217° C.

Analysis.—Calcd. for $C_6H_5Cl_3N_2O_4$ (percent): C, 26.15; H, 1.83; N, 10.17. Found (percent): C, 26.37; H, 2.01; N, 10.27.

EXAMPLE 6

Preparation of 6-methyl-4-(phenylcarbamoyl)-2H-1,2,4-oxadiazine-3,5-(4H,6H,)-dione A mixture of 6.5 parts of 6-methyl-2H-1,2,4-oxadiazine-3,5-(4H,6H)-dione, 5.95 parts of phenyl isocyanate, 0.05 part of dibutyltin dilaurate, and 88 parts of benzene is stirred and boiled under reflux for five hours. The precipitated solid is collected by filtration and recrystallized from acetonitrile to give the desired product, 6-methyl-2H-1,2,4-oxadiazine-3,5-(4H,6H)dione, which exhibits a melting point of 174 to 177° C.

Analysis.—Calcd. for $C_{11}H_{11}N_3O_4$ (percent): C, 53.0; H, 4.45; N, 16.86. Found (percent): C, 53.59; H, 4.25; N, 16.93.

EXAMPLE 7

Preparation of 4-hydroxymethyl-6-methyl-2H-1,2,4-oxadiazine-3,5(4H,6H)-dione

A mixture of 13.0 parts of 6-methyl-2H-1,2,4-oxadiazine-3,5-(4H,6H)-dione, 8.1 parts of 37% aqueous formaldehyde solution, and 50 parts of water is refluxed for approximately 5 minutes. The solvent is removed under vacuum at 30° C. The viscous residue partially crystallizes on standing. The solids are washed with benzene/tetrahydrofuran, and recrystallized from ethylene dichloride to give white crystals of 4-hydroxymethyl-6-methyl-2H-1,2,4-oxadiazine-3,5-(4H,6H)-dione, which melt at 85–93° C.

Analysis.—Calcd. for $C_5H_8N_2O_4$ (percent): C, 37.5; H, 5.04; N, 17.5. Found (percent): C, 37.32; H, 5.01; N, 17.29.

EXAMPLES 8–59

The compounds listed in the following table are prepared according to the procedures of Examples 1 through 7 by substituting equivalent amounts of the listed oxadiazinedione starting materials, substitution reagents, and bases (if used), for those used in the Examples 1 through 7:

| Example | Oxadiazinedione starting material | Parts by wt. | Substitution reagent | Parts by wt. | Base (if used) | Parts by wt. | Substituted oxadiazinedione product |
|---|---|---|---|---|---|---|---|
| 8 | 2H-1,2,4-oxadiazine-3,5-(4H,6H)-dione | | Trichloromethanesulfenyl chloride | 5.8 | NaOH | 9.3 | 4-(trichloromethylthio)-2H-1,2,4-oxadiazine-3,5-(4H,6H)-dione. |
| 9 | ...do | | 2,4-dinitrobenzenesulfenyl chloride | 5.8 | NaOH | 11.7 | 4-(2,4-dinitrophenylthio)-2H-1,2,4-oxadiazine-3,5-(4H,6H)-dione. |
| 10 | ...do | | Benzoyl chloride | 5.8 | NaOH | 7.0 | 4-benzoyl-2H-1,2,4-oxadiazine-3,5-(4H,6H)-dione. |
| 11 | ...do | | Oxalyl chloride | 5.8 | NaOH | 3.2 | 4,4'-oxalyl-bis-[2H-1,2,4-oxadiazine-3,5-(4H,6H)-dione]. |
| 12 | ...do | | Formaldehyde | 5.8 | NaOH | 1.5 | 4-hydroxymethyl-2H-1,2,4-oxadiazine-3,5-(4H,6H)-dione. |
| 13 | ...do | | Phenyl isocyanate | 5.8 | NaOH | 6.0 | 4-(phenylcarbamoyl)-2H-1,2,4-oxadiazine-3,5-(4H,6H)-dione. |
| 14 | 2,6-dimethyl-2H-1,2,4-oxadiazine-3,5-(4H,6H)-dione | | Trichloromethanesulfenyl chloride | 7.2 | NaOH | 9.3 | 2,6-dimethyl-4-(trichloromethylthio)-2H-1,2,4-oxadiazine-3,5-(4H,6H)-dione. |
| 15 | ...do | | 2,4-dinitrobenzenesulfenyl chloride | 7.2 | KOH | 11.7 | 2,6-dimethyl-4-(2,4-dinitrophenylthio)-2H-1,2,4-oxadiazine-3,5-(4H,6H)-dione. |
| 16 | 2-phenyl-6-methyl-2H-1,2,4-oxadiazine-3,5-(4H,6H)-dione | | Trichloromethanesulfenyl chloride | 10.3 | KOH | 9.3 | 2-phenyl-6-methyl-4-(trichloromethylthio)-2H-1,2,4-oxadiazine-3,5-(4H,6H)-dione. |
| 17 | ...do | | 2,4-dinitrobenzenesulfenyl chloride | 10.3 | NaOH | 11.7 | 2-phenyl-6-methyl-4-(2,4-dinitrophenylthio)-2H-1,2,4-oxadiazine-3,5-(4H,6H)-dione. |
| 18 | 6-methyl-2H-1,2,4-oxadiazine-3,5-(4H,6H)-dione | | Benzenesulfenyl chloride | 6.5 | NaOH | 7.0 | 6-methyl-4-phenylthio-2H-1,2,4-oxadiazine-3,5-(4H,6H)-dione. |
| 19 | ...do | | Methanesulfenyl chloride | 6.5 | NaOH | 4.1 | 6-methyl-4-(methylthio)-2H-1,2,4-oxadiazine-3,5-(4H,6H)-dione. |
| 20 | ...do | | Propanesulfenyl chloride | 6.5 | NaOH | 4.8 | 6-methyl-4-(propylthio)-2H-1,2,4-oxadiazine-3,5-(4H,6H)-dione. |
| 21 | ...do | | p-Nitrobenzenesulfenyl chloride | 6.5 | NaOH | 9.5 | 6-methyl-4-(p-nitrophenylthio)-2H-1,2,4-oxadiazine-3,5-(4H,6H)-dione. |
| 22 | ...do | | p-Chlorobenzenesulfenyl chloride | 6.5 | NaOH | 9.0 | 6-methyl-4-(p-chlorophenylthio)-2H-1,2,4-oxadiazine-3,5-(4H,6H)-dione. |
| 23 | ...do | | p-Toluenesulfenyl chloride | 6.5 | NaOH | 7.9 | 6-methyl-4-(p-tolylthio)-2H-1,2,4-oxadiazine-3,5-(4H,6H)-dione. |
| 24 | ...do | | p-methoxybenzenesulfenyl chloride | 6.5 | NaOH | 8.7 | 6-methyl-4-(p-anisylthio)-2H-1,2,4-oxadiazine-3,5-(4H,6H)-dione. |
| 25 | ...do | | p-Isopropylbenzoyl chloride | 6.5 | NaOH | 9.1 | 6-methyl-4-(p-isopropylbenzoyl)-2H-1,2,4-oxadiazine-3,5-(4H,6H)-dione. |
| 26 | ...do | | Phenoxyacetyl chloride | 6.5 | NaOH | 8.5 | 6-methyl-4-phenoxyacetyl-2H-1,2,4-oxadiazine-3,5-(4H,6H)-dione. |
| 27 | ...do | | 2,4,5-trichlorophenoxyacetyl chloride | 6.5 | NaOH | 13.7 | 6-methyl-4-(2,4,5-trichlorophenoxyacetyl)-2H-1,2,4-oxadiazine-3,5-(4H,6H)-dione. |
| 28 | ...do | | Acetyl chloride | 6.5 | (¹) | 3.9 | 6-methyl-4-acetyl-2H-1,2,4-oxadiazine-3,5-(4H,6H)-dione. |
| 29 | ...do | | Enanthoyl chloride | 6.5 | NaOH | 7.4 | 6-methyl-4-enanthoyl-2H-1,2,4-oxadiazine-3,5-(4H,6H)-dione. |
| 30 | ...do | | 3-methoxypropionyl chloride | 6.5 | NaOH | 6.1 | 6-methyl-4-(3-methoxypropionyl)-2H-1,2,4-oxadiazine-3,5-(4H,6H)-dione. |
| 31 | ...do | | Trichloroacetyl chloride | 6.5 | NaOH | 9.1 | 6-methyl-4-trichloroacetyl-2H-1,2,4-oxadiazine-3,5-(4H,6H)-dione. |
| 32 | ...do | | Acetoacetyl flouride | 6.5 | NaOH | 5.2 | 6-methyl-4-acetoacetyl-2H-1,2,4-oxadiazine-3,5-(4H,6H)-dione. |
| 33 | ...do | | p-Nitrobenzoyl chloride | 6.5 | NaOH | 9.3 | 6-methyl-4-p-nitrobenzoyl-2H-1,2,4-oxadiazine-3,5-(4H,6H)-dione. |
| 34 | ...do | | p-Chlorobenzoyl chloride | 6.5 | NaOH | 8.7 | 6-methyl-4-p-chlorobenzoyl-2H-1,2,4-oxadiazine-3,5-(4H,6H)-dione. |
| 35 | ...do | | p-Methoxybenzoyl chloride | 6.3 | NaOH | 8.5 | 6-methyl-4-p-methoxybenzoyl-2H-1,2,4-oxadiazine-3,5-(4H,6H)-dione. |
| 36 | ...do | | m-Toluoyl chloride | 6.5 | NaOH | 7.7 | 6-methyl-4-m-toluoyl-2H-1,2,4-oxadiazine-3,5-(4H,6H)-dione. |
| 37 | ...do | | Phenylacetyl chloride | 6.5 | NaOH | 7.7 | 6-methyl-4-(phenylacetyl)-2H-1,2,4-oxadiazine-3,5-(4H,6H)-dione. |
| 38 | ...do | | p-Nitrophenylacetyl chloride | 6.5 | NaOH | 10.0 | 6-methyl-4-(p-nitrophenylacetyl)-2H-1,2,4-oxadiazine-3,5-(4H,6H)-dione. |
| 39 | ...do | | p-Chlorophenylacetyl chloride | 6.5 | NaOH | 9.5 | 6-methyl-4-(p-chlorophenylacetyl)-2N-1,2,4-oxadiazine-3,5-(4H,6H)-dione. |
| 40 | ...do | | p-Tolylacetyl chloride | 6.5 | NaOH | 9.5 | 6-methyl-4-(p-tolylacetyl)-2H-1,2,4-oxadiazine-3,5-(4H,6H)-dione. |
| 41 | ...do | | p-Methoxyphenylacetyl chloride | 6.5 | NaOH | 9.2 | 6-methyl-4-(p-methoxyphenylacetyl)-2H-1,2,4-oxadiazine-3,5-(4H,6H)-dione. |
| 42 | ...do | | Methyl chloroformate | 6.5 | NaOH | 4.7 | 6-methyl-4-(methoxycarbonyl)-2H-1,2,4-oxadiazine-3,5-(4H,6H)-dione. |
| 43 | ...do | | Hexyl chloroformate | 6.5 | NaOH | 8.2 | 6-methyl-4-(hexyloxycarbonyl)-2H-1,2,4-oxadiazine-3,5-(4H,6H)-dione. |
| 44 | ...do | | Methyl chloroglyoxylate | 6.5 | NaOH | 6.1 | 6-methyl-4-(methoxyoxalyl)-2H-1,2,4-oxadiazine-3,5-(4H,6H)-dione. |
| 45 | ...do | | Butyl chloroglyoxylate | 6.5 | NaOH | 7.5 | 6-methyl-4-(butyloxyoxalyl)-2H-1,2,4-oxadiazine-3,5-(4H,6H)-dione. |
| 46 | ...do | | Phosgene | 6.5 | NaOH | 2.5 | 4,4'-carbonyl-bis-[6-methyl-2H-1,2,4-oxadiazine-3,5-(4H,6H)-dione]. |
| 47 | ...do | | Dimethylcarbamoyl chloride | 6.5 | NaOH | 5.4 | 6-methyl-4-(dimethylcarbamoyl)-2H-1,2,4-oxadiazine-3,5-(4H,6H)-dione. |

TABLE—Continued

| Example | Oxadiazinedione starting material | Parts by wt. | Substitution reagent | Parts by wt. | Base (if used) | Parts by wt. | Substituted oxadiazinedione product |
|---|---|---|---|---|---|---|---|
| 48 | do | | p-Chlorophenyl isocyanate | 6.5 | | 7.7 | 6-methyl-4-(p-chlorophenylcarbamoyl)-2H-1,2,4-oxadiazine-3,5-(4H,6H)-dione. |
| 49 | do | | p-Nitrophenyl isocyanate | 6.5 | | 8.2 | 6-methyl-4-(p-nitrophenylcarbamoyl)-2H-1,2,4-oxadiazine-3,5-(4H,6H)-dione. |
| 50 | do | | p-Tolyl isocyanate | 6.5 | | 6.7 | 6-methyl-4-(p-tolylcarbamoyl)-2H-1,2,4-oxadiazine-3,5-(4H,6H)-dione. |
| 51 | do | | p-Methoxyphenyl isocyanate | 6.5 | | 7.5 | 6-methyl-4-(p-methoxyphenylcarbamoyl)-2H,1,2,4-oxadiazine-3,5-(4H,6H)-dione. |
| 52 | do | | Propyl isocyanate | 6.5 | | 4.3 | 6-methyl-4-propylcarbamoyl-2H-1,2,4-oxadiazine-3,5-(4H,6H)-dione. |
| 53 | do | | Hexyl isocyanate | 6.5 | | 6.4 | 6-methyl-4-hexylcarbamoyl-2H-1,2,4-oxadiazine-3,5-(4H,6H)-dione. |
| 54 | do | | Methyl isocyanate | 6.5 | | 2.9 | 6-methyl-4-methylcarbamoyl-2H-1,2,4-oxadiazine-3,5-(4H,6H)-dione. |
| 55 | do | | Butyl isocyanate | 6.5 | | 5.0 | 6-methyl-4-butylcarbamoyl-2H-1,2,4-oxadiazine-3,5-(4H,6H)-dione. |
| 56 | do | | N-methyl-N-phenylcarbamoyl chloride | 6.5 | NaOH | 8.5 | 6-methyl-4-(N-methyl-N-phenylcarbamoyl)-2H-1,2,4-oxadiazine-3,5-(4H,6H)-dione. [1] |
| 57 | 2H-1,2,4-oxadiazine-3,5-(4H, 6H)-dione | | p-Nitrobenzene-sulfenyl chloride | 5.8 | NaOH | 9.5 | 4-(p-nitrophenylthio)-2H-1,2,4-oxadiazine-3,5-(4H,6H)-dione. |
| 58 | 6-methyl-2H-1,2,4-oxadiazine-3,5-(4H, 6H)-dione | | Ethyl thiolchloroformate | 6.5 | NaOH | 6.1 | 6-methyl-4-(ethylthiolcarbonyl)-2H-1,2,4-oxadiazine-3,5-(4H,6H)-dione. |
| 59 | do | | o-Fluorophenyl isocyanate | 6.5 | | 6.9 | 6-methyl-4-(o-fluorophenylcarbamoyl)-2H-1,2,4-oxadiazine-3,5-(4H,6H)-dione. |

[1] Triethylamine.

EXAMPLE 60

Preparation of 6-methyl-4-methoxymethyl-2H-1,2,4-oxadiazine-3,5-(4H, 6H)-dione

A mixture of 16 parts of 6-methyl-4-hydroxymethyl-2H-1,2,4-oxadiazine-3,5-(4H, 6H)-dione, 0.2 part of concentrated hydrochloric acid, and 100 parts of methanol is kept at room temperature for 24 hours and is then evaporated under reduced pressure at 25° C. to yield an oil. The oil consists mainly of 6-methyl-4-methoxymethyl-2H-1,2,4-oxadiazine-3,5-(4H, 6H)-dione.

EXAMPLE 61

Preparation of 6-methyl-4-(methylmercaptomethyl)-2H-1,2,4-oxadiazine-3,5-(4H, 6H)-dione A mixture of 16 parts of 6-methyl-4-hydroxymethyl-2H-1,2,4-oxadiazine-3,5-(4H, 6H)-dione, 0.2 part of concentrated hydrochloric acid, 10 parts of methyl mercaptan, and 100 parts of methanol is kept at room temperature for 24 hours and then evaporated under reduced pressure at 25° C. to yield an oil. The oil consists mainly of 6 - methyl-4-(methylmercaptomethyl)-2H-1,2,4-oxadiazine-3,5-(4H, 6H)-dione.

EXAMPLES 62–65

The compounds listed below are prepared according to the procedures of Examples 60 and 61:

| Example | Reactant alcohol or mercaptan | Parts by wt. | Substituted oxadiazinedione product |
|---|---|---|---|
| 62 | n-Butanol | 100 | 6-methyl-4-(n-butoxymethyl)-2H-1,2,4-oxadiazine-3,5-(4H, 6H)-dione. |
| 63 | Cyclohexanol | 100 | 6-methyl-4-(cyclohexoxymethyl)-2H-1,2,4-oxadiazine-3,5-(4H, 6H)-dione. |
| 64 | Thiophenol | 100 | 6-methyl-4-(phenylmercaptomethyl)-2H-1,2,4-oxadiazine-3,5-(4H, 6H)-dione. |
| 65 | Benzylmercaptan | 100 | 6-methyl-4-(benzylthiomethyl)-2H-1,2,4-oxadiazine-3,5-(4H, 6H)-dione. |

EXAMPLE 66

Wettable powder: Percent
6 - methyl - 4 - (trichloromethylthio)-2H-1,2,4-oxadiazine - 3,5-(4H, 6H)-dione _____ 80
Sodium alkylnaphthalenesulfonate _____ 2
Sodium ligninsulfonate _____ 2
Synthetic amorphous silica _____ 3
Kaolinite _____ 13

The ingredients are thoroughly blended, passed through a hammer mill to produce an average particle size under 40 microns, reblended and sifted through a U.S.S. #50 sieve (0.3 mm. opening) before packaging.

Two kilograms of the above material are suspended in 500 liters of water and sprayed on a hectare of Kentucky bluegrass growing along a highway in the spring after the grass is growing vigorously and before being mowed. The treatment retards the growth of the grass very effectively. The grass stays neat for six weeks before mowing is again required. Only a minimum of mowing is required to maintain the area for the year.

EXAMPLE 67

Wettable power: Percent
4 - (4 - nitrophenylthio)-2H-1,2,4-oxadiazine-3,5-(4H, 6H)-dione _____ 25
Dodecylphenol polyethyleneglycol ether _____ 2
Sodium lignin sulfonate _____ 4
Amorphous fine silica _____ 6
Montmorillonite (calcined) _____ 63

The ingredients are thoroughly blended. The liquid surfactant is added by spraying upon the solid ingredients in the blender. After grinding in a hammer mill to produce particles essentially all below 200 microns, the material is reblended and sifted through a U.S.S. No. 50 sieve (0.3 mm. opening) and packaged.

All compounds of this invention can be formulated in similar fashion.

Twenty-five kilograms of this formulation are suspended in 600 liters of water and sprayed on a hectare of mixed grasses growing in a park. The treatment is made in the spring after the grasses are actively growing and have been mowed to a 2½ inch height. This application retards the growth of the grasses and reduces the number of mowings necessary to maintain the area for the season.

Other compounds of this invention may be applied in the same manner and give similar results.

EXAMPLE 68

Wettable powder:  Percent
4 - (2,4 - dinitrophenylthio)-6-methyl-2H-1,2,4-
  oxadiazine - 3,5-(4H, 6H)-dione _____ 50
Dioctyl sodium sulfosuccinate _____ 1.5
Crude calcium: magnesium lignin sulfonate ____ 2
Low-viscosity methylcellulose _____ 1.5
Attapulgite _____ 35
Kaolinite _____ 10

The ingredients are thoroughly blended, passed through an air mill, to produce an average particle size under 15 microns, reblended and sifted through a U.S.S. #50 sieve (0.3 mm. opening) before packaging.

Eight kilograms of this composition are suspended in 300 liters of water and applied to a hectare of Bermuda grass turf. The application is made after the turf has been mowed for the second time in the spring. This treatment effectively retards the growth of the grass for about six weeks. At this time it is mowed and a second application made. These treatments keep the number of mowings necessary to maintain the area for the season to a minimum.

EXAMPLE 69

Aqueous suspension:  Percent
4 - trichloromethylthio - 2H - 1,2,4-oxadiazine-
  3,5 - (4H, 6H) - dione _____ 10
Hydrated attapulgite _____ 3
Crude calcium: magnesium lignosulfonate ____ 5
Sodium dihydrogen phosphate _____ 0.5
Water _____ 81.5

The ingredients are ground together in a ball or roller mill until the particles in suspension have been reduced to diameters under 5 microns.

Sixty kilograms of the above composition are applied to a hectare of sugar cane approximately six weeks before harvest is intended. This material may be applied by airplane without further dilution or further diluted with water before application. This application causes the cane to ripen and increases the percent sugar in the treated stalks when they are harvested.

EXAMPLE 70

Aqueous suspension:  Percent
6 - methyl - 4 - (trichloromethylthio)-2H-1,2,
  4 - oxadiazine - 3,5 - (4H, 6H)-dione _____ 35
Sodium lignin sulfonate _____ 5
Hydrated attapulgite _____ 1
Sodium pentachlorophenate _____ 0.5
Water _____ 58.5

The components are ground in a continuous sand mill until substantially all particles are below 5 microns with many near one micron or less. The effluent from the grinder is passed through a U.S.S. #200 sieve (74 microns) to eliminate extraneous material and is packaged for use.

Ten kilograms of this composition are suspended in 500 liters of water and sprayed on a hectare of road right-of-way planted to Kentucky fescue. The application is made in the spring after the grass is actively growing and has been mowed once. This application retards the growth of the grass during the remaining spring months and reduces the labor required to maintain the right-of-way. A second application is made in the early fall as the grass begins its second period of very active growth, thereby further reducing the labor required to maintain the right-of-way for the year.

EXAMPLE 71

Solution:  Percent
6 - methyl - 4 - (trichloromethylthio)-2H-1,2,4-
  oxadiazine - 3,5 - (4H, 6H)-dione _____ 30
Dimethyl sulfoxide _____ 45
Propylene glycol _____ 25

The ingredients are combined and stirred with warming to produce a solution. This can be used for low volume applications.

Nine kilograms of the above composition are diluted to ten gallons with water and 6.5% "Tween Twenty" (polysorbitan monolaurate) added. This is sprayed on a hectare of bluegrass lawn in front of an office building. The application is made in late April after the second mowing. The treatment reduces the number of mowings necessary to maintain the lawn by retarding the growth of the grass. A second application is made about September 1 when the grass begins a second spurt of growth. The grass is again retarded and few mowings are required to maintain it for the fall, but it stays green and attractive.

I claim:

1. Compounds of the formula (I) 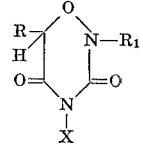

wherein

R is hydrogen or methyl;

$R_1$ is hydrogen, alkyl of 1 through 6 carbon atoms or phenyl; and

X is phenoxyacetyl; phenoxyacetyl substituted on phenyl with from 1 through 3 chlorine atoms; acetoacetyl;

wherein $R_2$ is alkyl of 1 through 3 carbon atoms; alkyl of 1 through 3 carbon atoms substituted with from 1 through 7 chlorine atoms; phenyl; or phenyl substituted with one nitro group or from 1 through 3 chloro, methyl or methoxy groups;

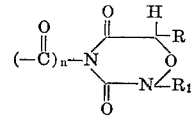

wherein $R_3$ is alkyl of 1 through 6 carbon atoms, alkyl of 1 through 6 carbon atoms substituted with from 1 through 7 chlorine atoms or 1 through 2 methoxy groups, phenyl; phenyl substituted with 1 through 2 nitro, halogen, methoxy or alkyl groups of 1 through 3 carbon atoms, benzyl, benzyl substituted with 1 through 2 nitro, chloro, methyl or methoxy groups, alkoxy of 1 through 6 carbon atoms, alkylthio of 1 through 6 carbon atoms, alkoxycarbonyl of 2 through 5 carbon atoms, or

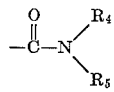

wherein $n$ is 1 or 2 and R and $R_1$ are as defined above;

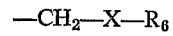

wherein $R_4$ is hydrogen or alkyl of 1 through 3 carbon atoms, and $R_5$ is hydrogen, alkyl of 1 through 6 carbon atoms, phenyl, or phenyl substituted with 1 through 2 nitro, chloro, methyl or methoxy groups; or

—$CH_2$—X—$R_6$ wherein X is oxygen or sulfur, and $R_6$ is alkyl of 1 through 4 carbon atoms or hydrogen and provided that when X is sulfur, $R_6$ can be phenyl or benzyl; and when X is oxygen, $R_6$ can be cyclohexyl.

2. Compounds of Formula I of claim 1 wherein R is methyl, $R_1$ is hydrogen, and X is hydroxymethyl,

wherein $R_2$ is alkyl of 1 through 3 carbon atoms substituted with 1 through 5 chlorine atoms, or

wherein $R_3$ is alkyl of 1 through 3 carbon atoms.

3. 6 - methyl - 4 - (trichloromethylthio) - 2H - 1,2,4-oxadiazine-3,5-(4H, 6H)-dione.

4. 4 - benzoyl - 6 - methyl - 2H - 1,2,4 - oxadiazine-3,5-(4H, 6H)-dione.

5. 6 - methyl - 4 - trichloroacetyl-2H-1,2,4-oxadiazine-3,5-(4H, 6H)-dione.

6. 6 - methyl - 4 - (p-chlorophenylcarbamoyl)-2H-1,2,4-oxadiazine-3,5-(4H, 6H)-dione.

7. 6 - methyl - 4 - (o-fluorophenylcarbamoyl)-2H-1,2,4-oxadiazine-3,5-(4H, 6H)-dione.

8. 4,4'-oxalylbis[6-methyl - 2H - 1,2,4-oxadiazine-3,5-(4H, 6H)-dione].

9. 4,4' - carbonylbis[6-methyl - 2H - 1,2,4-oxadiazine-3,5-(4H, 6H)-dione].

10. 4-hydroxymethyl - 6 - methyl-2H-1,2,4-oxadiazine-3,5-(4H, 6H)-dione.

References Cited
UNITED STATES PATENTS 3,438,985  4/1969  Bernstein et al. _____ 260—244

HENRY R. JILES, Primary Examiner

R. T. BOND, Assistant Examiner

U.S. Cl. X.R.

71—92